Dec. 15, 1942.   R. C. PYLE ET AL   2,305,275
WINDOW CONSTRUCTION
Filed Aug. 2, 1939   2 Sheets-Sheet 1

INVENTORS:
Ralph C. Pyle and
Herbert C. Munroe
BY Spear, Rawlings & Spear
ATTORNEYS.

Dec. 15, 1942.    R. C. PYLE ET AL    2,305,275
WINDOW CONSTRUCTION
Filed Aug. 2, 1939    2 Sheets-Sheet 2
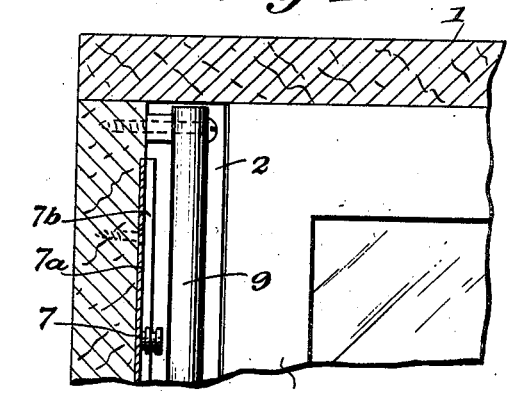
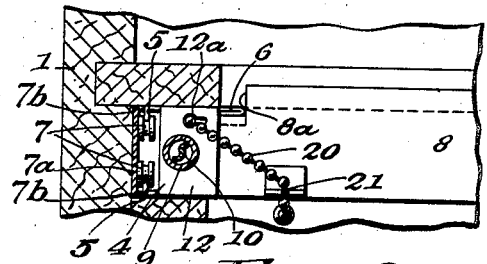
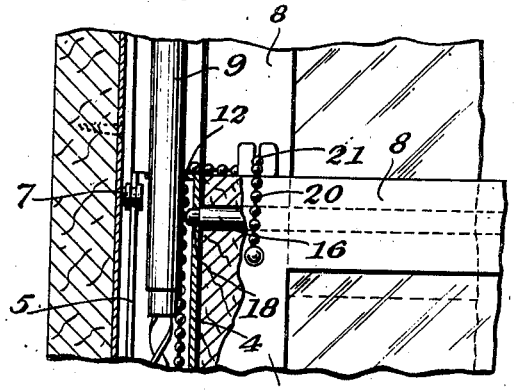
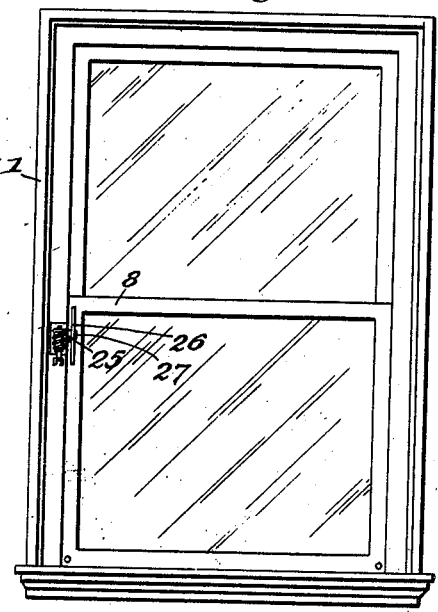
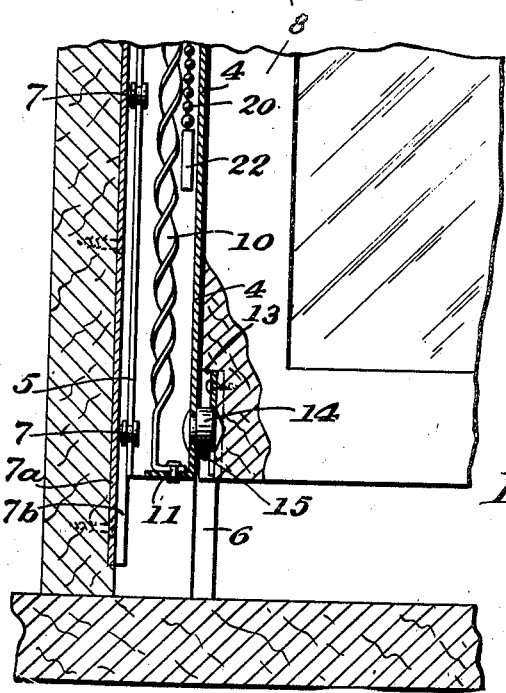
INVENTORS:
Ralph C. Pyle and
Herbert C. Munroe
BY Spear, Rawlings & Spear
ATTORNEYS.

Patented Dec. 15, 1942

2,305,275

UNITED STATES PATENT OFFICE 2,305,275

WINDOW CONSTRUCTION

Ralph C. Pyle, Boston, and Herbert C. Munroe, Florence, Mass., assignors to William H. Gilderson, Reading, Mass.

Application August 2, 1939, Serial No. 287,954

2 Claims. (Cl. 20—49)

Our present invention relates to improvements in that type of window that in addition to being vertically adjustable may also be swung inwardly for ventilation or cleaning and quickly and easily removed if desired.

That type of window has many advantages. For example, the inward pivoting of the window permitting ventilation without drafts and the cleaning of both surfaces of the pane from the inside of the room are features of real and obvious importance. Likewise, the fact that the windows may be quickly and easily removed is an advantage. This type of window construction has, therefore, potentially wide utility in all types of buildings.

In the construction and installation of windows of this type, the windows are pivotally mounted on vertically adjustable carriers located in the stile grooves or channels and locks are generally provided to hold the windows in vertical alinement with the carriers.

We are aware of the fact that several windows of this type have been proposed, but such structures were not suitable for commercial use because of their inherently high cost and because of certain objectionable features, among which the control of the window when the window is released from the carriers to be pivoted inwardly for ventilation or cleaning, is a notable example.

In the proposed structures, the inward pivoting of the windows when released from the carriers was controlled in a variety of different ways. In some of these, the windows could be swung inwardly into only one position. In other proposed structures, a brace was employed that permitted a limited number of adjustments if detached from either the window or the casing and relocated. In a third structure, it was proposed that the window be at all times retained in an adjusted position by the weights that balances its vertical positions. While this last named proposal overcame the difficulty of too limited and cumbersome control of the window, it would be objectionable in use because subject to the influence of strong air currents on the pane and because it lacked safety.

In accordance with our invention, we utilize a novel control to permit the window when inwardly pivoted to be supported in a plurality of positions that may be quickly and easily established. This is effected by means detachably connected to the upper portion of the window and to either the carrier or to the window casing and adjustments of the position of the window may be effected without disturbance of the detachable connection or change in the point of locking.

Because of the differences in location of windows relative to the floor, it is necessary to provide means by which the inwardly swinging of the window may be controlled from a readily accessible point when the window can not be easily reached. In this modification of our invention, we employ a crank, preferably carried by the window casing and detachably connected to the window with gear or other suitable mechanism by which the crank can be easily rotated to provide desired adjustments of the window for ventilation.

In accordance with our invention, we provide a window construction, the operation of which is simple and reliable. While we have stressed the control of the inward pivoting of the window, this is not the only novel feature of our invention. Various other improvements by which our structure is made less expensive to manufacture and more useful to the purchaser, will be noted in the accompanying specification and drawings.

In the drawings:

Fig. 4 is an enlarged fragmentary section through a carrier showing the window balancing mechanism, locks and structure by which the window may be pivoted inwardly through a plurality of positions when the locks are released.

Fig. 5 is a fragmentary view showing in plan view the locking of the window holding means to the carrier means.

Fig. 6 shows a modified form of a window positioning device, and

Figs. 7 and 8 are enlarged fragmentary views of the device shown in Fig. 6.

Figure 3:
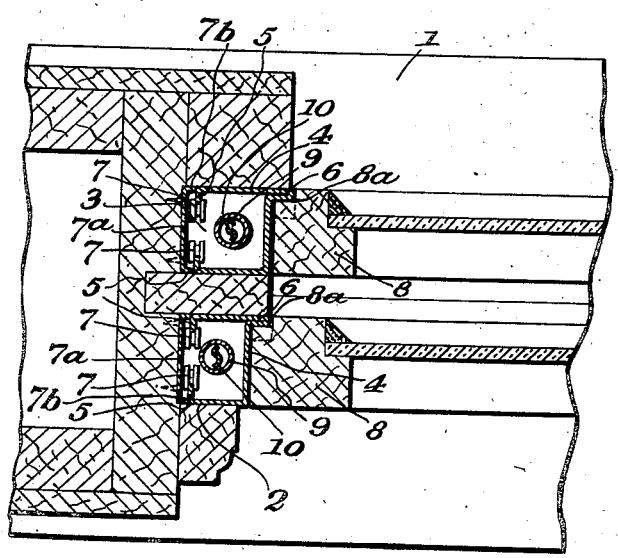
Fig. 3 is an enlarged fragmentary section showing the construction of our carriers.

At 1 we have indicated a typical window casing having stile grooves 2 and 3. We position carriers 4 in each of the stile grooves as may be most clearly seen in Fig. 3, the carriers 4 being substantially U-shaped in form with the ends inturned as at 5 and an exposed flange provided as at 6. While the carriers 4 may be slidably mounted in the stile grooves 2 and 3 in any desired way, we prefer to use a plurality of pairs of rollers 7 mounted in the stile grooves 2 and 3 to be engaged by the flange portions 5 of the carrier 4. These may be mounted in the stile channels or grooves as shown in Fig. 4 or may be carried by a supporting strip 7ᵃ mounted in the stile channels. Preferably the supporting strip 7ᵃ is marginally upturned as at 7ᵇ to establish bearing surfaces for the carriers 4.

In accordance with our invention any suitable means may be employed to balance the windows 8 and the carriers 4 in any vertically selected position. Because of the advantages inherent in the type of window positioning mechanism shown in Letters Patent No. 1,864,745, we prefer to use that type since it may be located entirely within the stile groove. Such mechanism consists of a member 9 mounted in the stile grooves or channels and a vertically movable member 10 attached as at 11 to a carrier 4 as may be most clearly seen at Fig. 4. Each of the carriers 4 is provided with a cap 11 formed with an aperture to receive and slidably engage with the stationary member 9 of the window adjusting mechanism. One of the caps 11 for each of the windows is formed with the keyhole aperture 12.

The sides of the windows 8 are formed at their lower edges with a recess 13 adapted to receive the pivot 14 carried by the member 4. A pin 15 extending through the sash of the window 8 and under the pin 15 as shown in Fig. 4 detachably locks the window 8 to the carriers 4 so that the windows cannot accidentally become disengaged from its carriers 4. Preferably, the sashes of the windows 8 are rabbeted as at 8ᵃ to lie flush against the flange 6 to establish a weatherproof construction.

Figure 1:
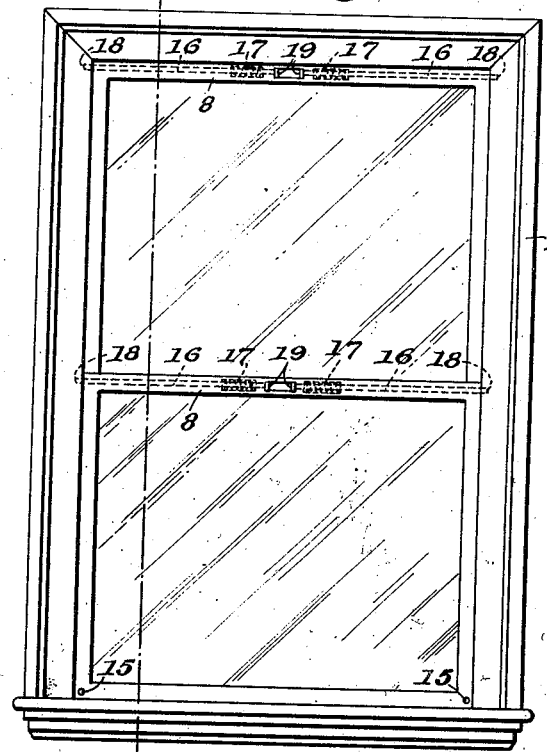
Fig. 1 is a view of a typical installation of our invention.
Figure 2:
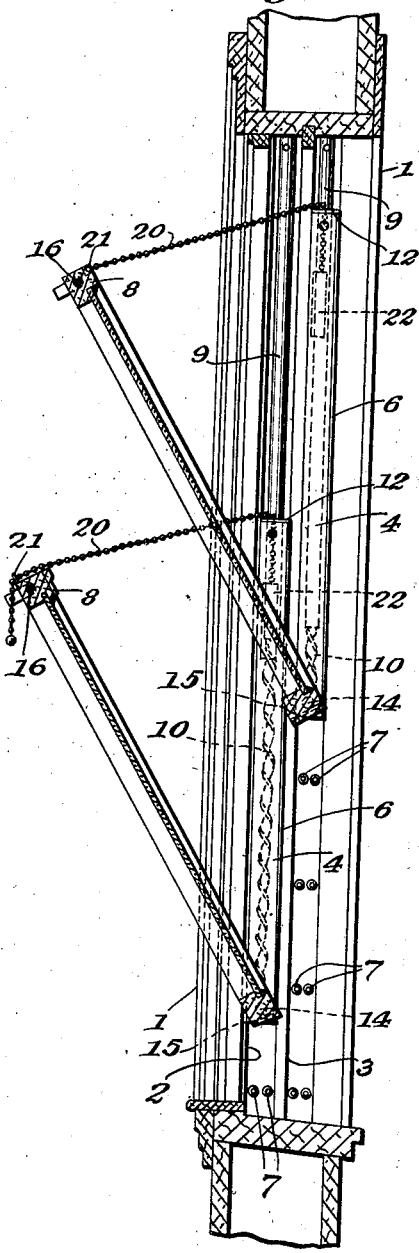
Fig. 2 is an enlarged vertical section along the lines 2—2 of Fig. 1 showing the windows raised and swung inwardly.

In windows of the type involved in our invention, it is necessary to employ locking means to normally hold the windows 8 in vertical alinement with the carriers 4. As may be most clearly seen from Figs. 1 and 4, suitable locking means may comprise rods 16 carried by the windows 8 under the control of springs 17 normally urging the rods 16 into apertures 18 in the carriers 4. At 19 we have shown the rod ends or heads centrally located so that they may be conveniently moved towards each other to permit the window to be released from the carriers 4 and swung inwardly.

When the window 8 is released from its carriers 4 to be swung inwardly as for ventilation or cleaning, means are required to limit the inward swinging of the window. In accordance with our invention, we provide a chain 20 or the like detachably connected as at 21 to the upper part of the windows 8. The chain 20 extends through the keyhole 12 of the cover plate 11 and into the carriers 4 where a weight 22 holds the chain 20 in proper position. Because of the nature of the chain 20 it passes freely through the larger portion of the keyhole 12, but may be readily locked in the smaller portion thereof as will be obvious from Fig. 5.

With this construction, the inward swinging of the windows 8 when released from their carriers 4 may be safely adjusted within a wide variety of limits without disturbance of the detachable connection 21 or the place of locking.

Where windows are located, as in many public buildings, a considerable distance above the floor, or where the size of the window presents a considerably wide factor, we prefer to control the inward pivoting of the window when released from the carriers 4 by the mechanism shown in Figs. 6, 7, and 8. As may be most clearly seen in Fig. 7, such mechanism comprises a crank 25 carried by the casing 1 engageable with a bracket 26 mounted on the window 8. The lower end of the bracket 26 is open to permit entrance therein of the pin 27 on the end of the crank 25. The crank 25 is in mesh with the worm gear 29 which may be rotated by a manually operable crank 30 from some accessible point. When the window is released from the carriers 4 rotation of the crank swings the window outwardly or inwardly and holds it securely in any selected position. When it is desired to disengage the window from the crank 25, the window is raised until the bracket 26 is disengaged from the pin 27. The crank may then be rotated out of position or the window may be directly removed in its raised position by withdrawing the pin 15.

In accordance with our invention, we are able to provide a safe, attractive window at low cost adapted for use in any type of building where the inward swinging of the windows for ventilation, cleaning or removal is desired.

What we therefore claim and desire to secure by Letters Patent is:

1. A window construction for installation in a window casing member having stile channels, carrier members in said channels, said carrier members including a U-shaped portion, means retaining said carrier members in any vertically selected position, a window, means pivotally connecting the lower portion of said window and said carrier members, means detachably locking said window in vertical alinement with said carrier members, and means adjustably locked to a carrier member and detachably connected to the upper portion of said window to hold said window in a plurality of inwardly inclined positions, said adjustable means comprising a U-shaped member carried by said window, a chain extending into said carrier member and engageable with said U-shaped member, and a weight carried by said chain within said carrier member to draw said chain into said carrier member when said chain is released.

2. A window construction for installation in a window casing member having stile channels, carrier members in said channels, said carrier members including a U-shaped portion and a cover plate for said portion having an aperture having a locking portion, means retaining said carrier members in any vertically selected position, a window, means pivotally connecting the lower portion of said window and said carrier members, means detachably locking said window in vertical alinement with said carrier members, and means adjustably locked to a carrier member and detachably connected to the upper portion of said window to hold said window in a plurality of inwardly inclined positions, said adjustable means comprising a chain extending into said U-shaped portion through said aperture in said cover plate and being adapted to be locked on entry into said locking portion, and a weight carried by said chain within said U-shaped portion to draw said chain into said carrier member when said chain is disengaged from said locking portion.

RALPH C. PYLE.
HERBERT C. MUNROE.